(No Model.) 2 Sheets—Sheet 1.
J. C. NICHOLLS.
CHICKEN BROODER.
No. 516,976. Patented Mar. 20, 1894.
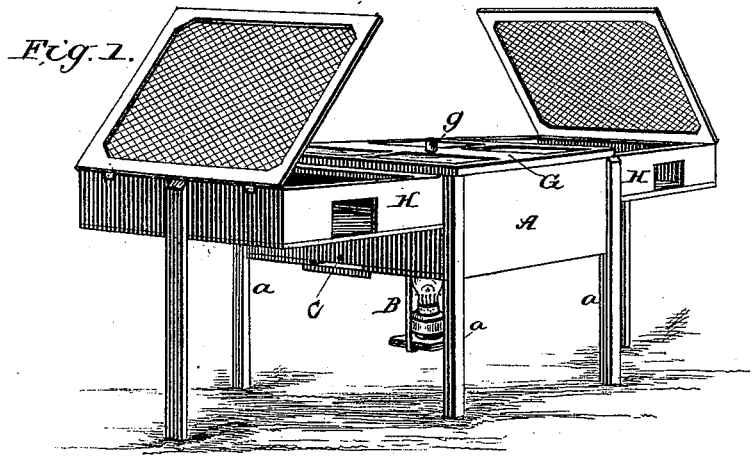
Fig. 1.
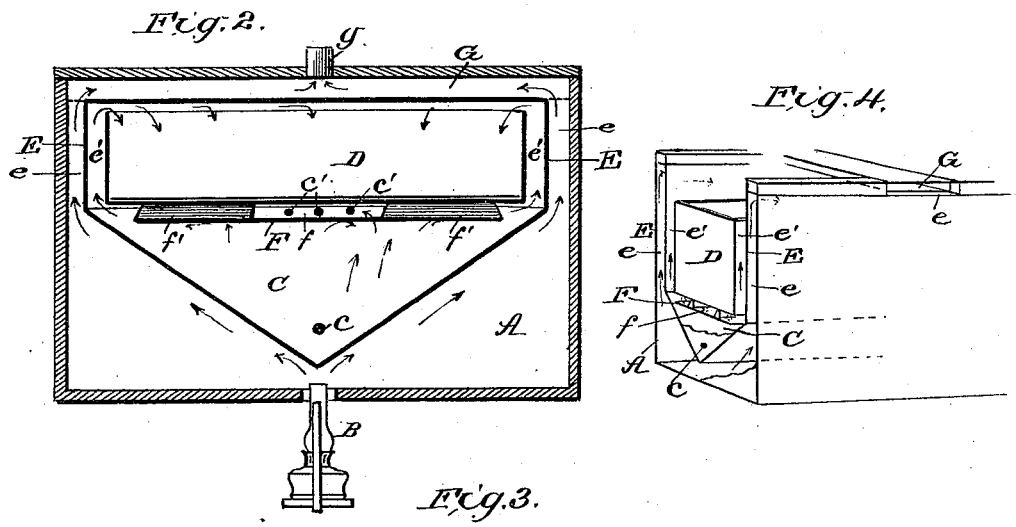
Fig. 2.
Fig. 4.
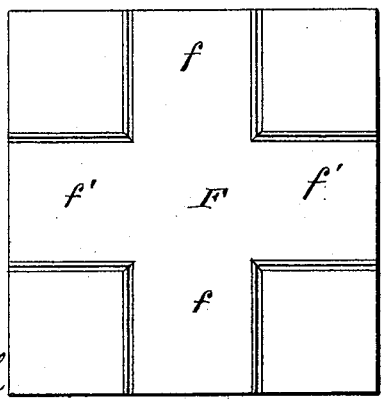
Fig. 3.
WITNESSES:
Fred G. Dieterich
Jos. A. Ryan
INVENTOR
John C. Nicholls
BY Munn & Co
ATTORNEYS.

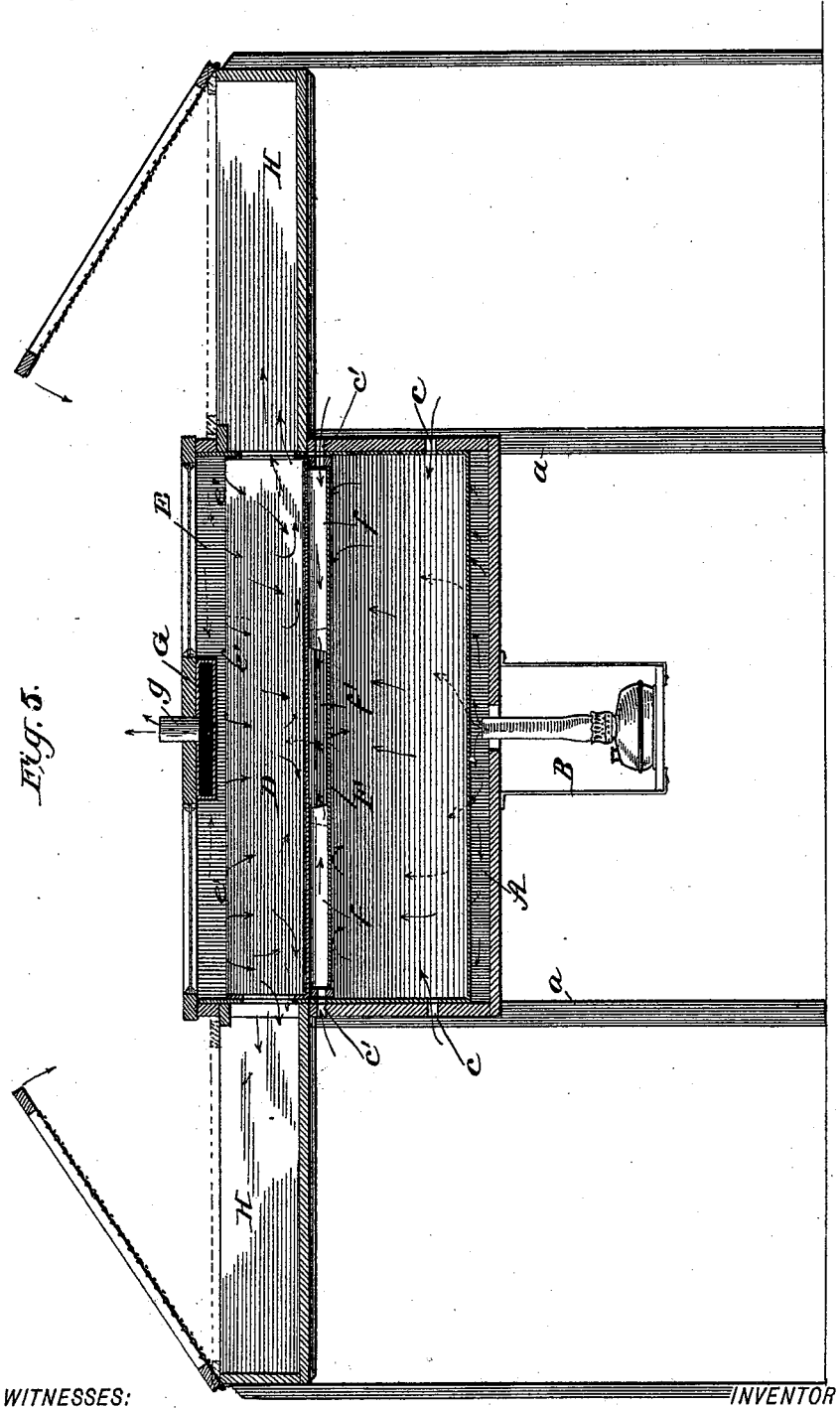

UNITED STATES PATENT OFFICE.

JOHN C. NICHOLLS, OF BLUE MOUND, ILLINOIS.

CHICKEN-BROODER.

SPECIFICATION forming part of Letters Patent No. 516,976, dated March 20, 1894.

Application filed June 12, 1893. Serial No. 477,292. (No model.)

*To all whom it may concern:*

Be it known that I, JOHN C. NICHOLLS, of Blue Mound, in the county of Macon and State of Illinois, have invented a new and useful Improvement in Chicken-Brooders, of which the following is a specification.

This invention relates to an improved chicken brooder for raising young chickens hatched by an incubator or by a natural mother.

The objects of my invention are first, to provide a device in which a greater portion of the heat will come from above and the bottom will be gently warmed; and secondly to provide a device in which fresh air only is supplied to the brood chamber, while all the products of combustion are utilized for heating purposes.

My invention therefore consists in the peculiar construction and arrangement of the various parts all of which will be fully described and claimed.

In the drawings forming a part of this specification, Figure 1 is a perspective view of my improved brooder. Fig. 2 is a central vertical section. Fig. 3 is a plan view of the supplemental bottom and Fig. 4 is a perspective view showing one end of the brooder the outer end being removed. Fig. 5 is a vertical longitudinal section of my improved brooder.

In carrying out my invention I employ an outer case or cabinet A which is supported upon the legs $a$ and may be of any suitable material. The case A is formed with a perforated bottom and suspended beneath the perforation is the lamp or heater B.

Within the case A is arranged the longitudinal trough shaped heating chamber C, with its bottom directly over the lamp B, and directly above the heating chamber C is the brood chamber or mother D said brood chamber being narrower than the chamber C, and from each side of the chamber C extends a vertical wall E. These walls E E extend longitudinally the entire length of the case A and provide two sets of flues, the flues $e$ between the walls E and case A being designed to carry off the products of combustion, while the flues $e'$ between the walls E and side of the brood chamber are intended to conduct the pure air heated in the chamber C, into the brood chamber D, and as the walls E are higher than the sides of the chamber D it will be seen that all the heated air will enter at the top. The heating chamber is provided with perforations $c\ c$ at each end of the case A for the admission of air, and it will be seen that the mother or brood chamber D being narrower than the chamber C and space between the walls E the air can pass freely from the chamber C into the brooder. The heating chamber is made trough shaped to protect the bottom of the brood chamber D as it is desired to have this bottom only gently warmed and if it were not for the inclined chamber the bottom would be heated too much directly above the lamp. As a further protection to the bottom of the brood chamber I provide a secondary floor F which is so constructed that when placed against the bottom of the brood chamber, there is formed a longitudinal flue $f$ and a transverse flue $f'$. Perforations $c'\ c'$ are also made in the case A at the end of the heating chamber near the top and said perforations serve to admit the fresh air to the longitudinal passage $f$. The fresh air is then carried to the center and passes into the transverse flue $f'$ and thence into the flue $e'$ to the brood chamber. In this manner, the bottom is kept temperate while pure air is heated and directed into the chamber from above. The products of combustion pass outside the chamber C and enter the longitudinal flues $e$ and from thence said products enter a transverse horizontal flue G, which is formed in the top of the case, and said flue is provided with an outlet $g$ through which the products escape. The cover or top of the box is also provided with one or more panels of glass to admit light to the brood chamber.

H indicates the runs at each side of the brood chamber, and if desired the brood chamber may be divided into compartments.

The brood chamber or each compartment is provided with a removable bottom covered with sand so that the chamber can be easily and readily cleaned when desired. It will thus be seen that I provide a brooder in which the bottom of the same is only gently warmed, and all the heat is directed from the top of brooder, one in which only pure air is admitted to the brood chamber and one in which the escaping products of combustion are utilized to supply the heat at the top.

Having thus described my invention, what I claim as new, and desire to secure by Letters Patent, is—

1. In a brooder, the combination with a case having a top and discharge flue in said top, a brood chamber, a heating chamber below the same, a heater, hot air flues on the sides of the brooder and communicating with the heating chamber, and the smoke flues arranged outside the hot air flues and communicating with the discharge flues in the top of the case substantially as shown and described.

2. The combination with a case, of its cover, having a transverse flue provided with an outlet, of a brood chamber, a heating chamber, and the flues leading to the transverse flue substantially as shown and described.

3. The combination with the case, of the brood chamber, the trough shaped heating chamber provided with air inlets, and the supplemental bottom having longitudinal and transverse flues all arranged substantially as shown and described.

4. The combination with the case, of its cover having a flue and exit, the brood chamber, the heating chamber, the flues leading from the heating to the brood chamber, and the flues leading to the transverse flue in the case to carry off the products of combustion all arranged substantially as shown and described.

JOHN C. NICHOLLS.

Witnesses:
CAL. H. REEMSNYDER,
J. A. EVANS.